United States Patent Office 2,769,126
Patented Oct. 30, 1956

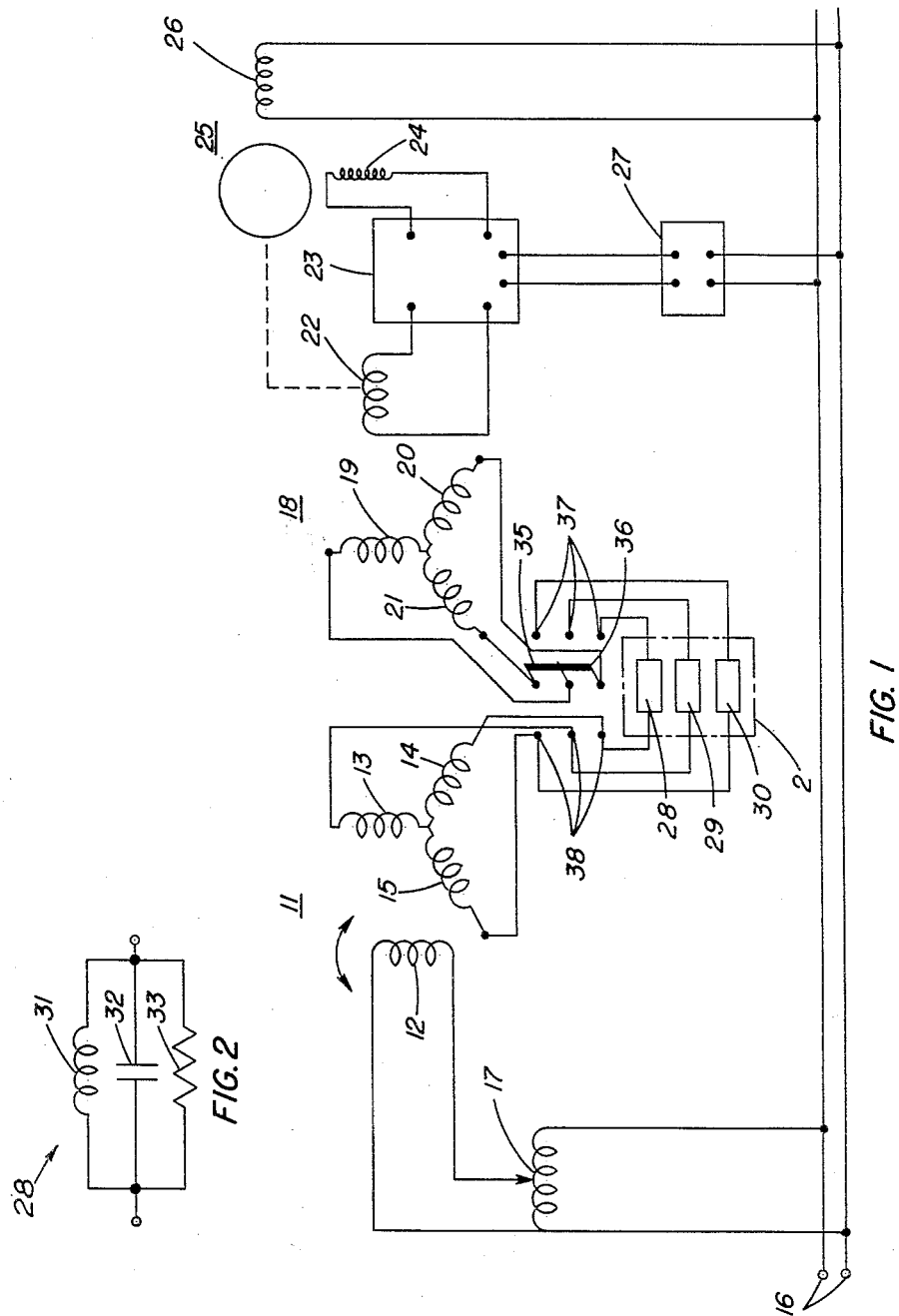

2,769,126

CORRECTOR FOR SYNCHRO SYSTEMS

Louis Pellecchia, New York, N. Y.

Application March 26, 1953, Serial No. 344,916

7 Claims. (Cl. 318—30)

(Granted under Title 35, U. S. Code (1952), sec. 266)

The invention described herein may be manufactured and used by or for the Government of the United States of America for governmental purposes without the payment of any royalties thereon or therefor.

The present invention concerns a corrector for velocity synchro systems. In particular the invention concerns a component of a synchro system in which three substantially identical impedances are connected in circuit between the synchro generator and the control transformer.

The basic requirement of a control transformer in a synchro system is that its effective value of voltage output be a sine function of its rotor position relative to the rotor position of the energizing generator (or transmitter) and of the intermediate differential generator if the latter is included in the system. However, when the system operates under speed conditions, the output voltage of the control transformer is also a function of speed. The component voltage introduced by speed operation is in effect an error in the magnitude and phase of the control transformer output; hence it may be called a speed error. Therefore, to permit high speed operation of synchro systems without an adverse effect on the accuracy of any synchro control transformer included therein and to further permit a synchro control transformer to give correct performance so that its output voltage is solely a function of angular displacement from true mechanical synchronism with the associated transmitter this invention is directed to a corrector device for use in the system. By means of this invention a control transformer voltage output unaffected by operating speed may be obtained.

Prior to the present invention one method of correction of speed errors in synchro systems was accomplished by use of a linear speed generator. A linear speed generator produces a voltage output which is directly proportional to speed. Its output is further characterized by substantially constant power factor. This voltage was injected in series with the voltage output of the synchro control transformer. The disadvantage of this type of corrector was that the phase angle of the injected voltage was correct for only a very limited range of speed. For speeds outside this limited range the phase angle between the voltage generated by the linear speed generator and the voltage generated by the control transformer resulted in an undesirable out-of-phase voltage component. Furthermore moving parts such as are present in the linear speed generator introduce error due to wear which increases maintenance requirements and decreases reliability.

The present invention overcomes these difficulties by providing a corrector that comprises three substantially identical and motionless impedances, the impedances being arranged in parallel between the synchro generator and the control transformer or between the differential generator and the control transformer if the system includes a synchro generator, differential generator and control transformer. By means of this corrector the difficulties arising from moving parts is eliminated. The further difficulty arising from the addition of two voltages with a difference in phase angle is also eliminated.

The speed corrector of this invention is adapted for use in synchro systems that employ standard type transmitters. The corrector is not suitable for systems employing commutator type transmitters because a control transformer is subject to much larger speed error voltages when energized by a commutator transmitter than when energized by a standard type transmitter and furthermore commutator transmitters are not sutiable for operation at speeds over 100 R. P. M. because of excessive sparking between brushes and commutator.

An object of the invention is to provide a corrector for synchro systems.

Another object is to provide a corrector for speed errors in synchro systems.

Another object is to provide a corrector for synchro systems comprising three impedances of equal value and arranged in parallel between the synchro generator and the control transformer.

Another object is to provide impedance means for eliminating speed error in the circuit energized by the positive sequence system and the negative sequence system of voltages generated by a synchro generator under speed operation.

Other objects and many of the attendant advantages of this invention will be readily appreciated as the same becomes better understood by reference to the following detailed description when considered in connection with the accompanying drawings wherein:

Fig. 1 is a diagrammatic view of a synchro system including a synchro generator and a control transformer and further including as a component therebetween a corrector forming a preferred embodiment of the present invention, Fig. 2 is a diagrammatic view showing an impedance forming a part of the corrector component of Fig. 1.

The secondary E. M. F.'s of synchro transmitters consist of two 3-phase balanced systems, one system of positive sequence, the other of negative sequence. This may be explained by the principle that the generator primary flux pulsating at frequency $f$ can be considered to be the resultant of two oppositely rotating D. C. flux vectors of magnitude one half the maximum value of the pulsating flux and rotating at speed $2\pi f$ relative to the pulsating flux axis. As the generator rotor is turned mechanically, the two D. C. flux vectors rotate at different speeds relative to the secondary windings, thereby inducing two distinct sets of balanced 3-phase secondary voltages, the two sets differing in both frequency and amplitude. Under speed conditions, the frequency of one voltage system increases with speed and reaches twice the value of the power supply frequency at synchronous speed. The frequency of the other system decreases with increasing speed and reaches zero frequency at synchronous speed. In the standard type transmitter, the voltage magnitudes are direct functions of the frequencies of the positive and negative sequence systems respectively.

If the positive and negative sequence currents had equal magnitudes and equal phase angles the voltage component producing speed error would become zero. A speed voltage exists because the impedances of the circuit do not vary with frequency in the same proportion as do the voltage amplitudes of the positive and negative sequence systems and also because such impedances do not maintain a constant ratio of resistance to reactance component with changing frequency.

The synchro system shown in Fig. 1 includes a standard synchro generator 11. The generator 11 has a rotor winding 12 and three symmetrically displaced stator windings 13, 14 and 15. The rotor winding 12 is connected to a 60 cycle supply voltage source 16. An autotransformer 17 is connected in circuit between source 16 and rotor winding 12. The transformer is used to modify the magnitude of the input voltage of source 16 to that required for proper rated operation. In circuit with generator 11 is a control transformer 18, which control transformer has corresponding symmetrically displaced windings 19, 20 and 21 plus a rotor winding 22. The output of the rotor 22 is fed into an amplifier 23.

A motor 25 is mechanically coupled to the rotor 22 of the control transformer 18. The motor 25 rotates when its field 24 is energized. The degree of energization of field 24 is dependent upon the output of rotor coil 22. The member 27 serves to displace the phase between the field coils 24 and 26 by 90 degrees in a manner which is well known and conventional in the art.

Intermediate the secondary of the synchro generator 11 and the primary of the control transformer 18 is a corrector 2. The corrector 2 comprises three impedances 28, 29 and 30 which are accurately matched to one another, that is, the corresponding parameters of the three impedances are of equal value. The details of each impedance is shown in Fig. 2. The impedance comprises a parallel arrangement of an inductance 31 a capacitance 32 and a resistance 33.

A triple pole double-throw switch 35 has an operating member 36. The poles of the operating member 36 of switch 35 are connected to each of the windings 19, 20 and 21 of control transformer 18. The switch 35 further comprises two sets of terminals 37 and 38. The terminals 37 are connected directly to one side of corresponding impedances 28, 29 and 30. The terminals 38 serve to connect the other side of the impedances 28, 29 and 30 to the windings 13, 14 and 15. When the switch operating member 36 is in open position, that is, disconnected from terminals 37 and 38 the control transformer 18 is decoupled from the synchro generator 11. If the operating member 36 is thrown to its left-hand position wherein it makes contact with terminals 38 the windings 13, 14 and 15 of the generator 11 is directly connected to the corresponding terminals 19, 20 and 21 of the control transformer 18. This switch position may be used when the system is in static, or position control operation. However when the system is used under dynamic, or velocity servo operating conditions namely when the generator rotor is rotating continuously the switch operating member 36 is thrown to its right-hand position to contact terminals 37. Through this connection impedances 28, 29 and 30 of corrector 27 is inserted in series with generator windings 14, 13, and 15 respectively, and control transformer windings 20, 19, and 21 respectively.

The relationship of resultant voltage output of a control transformer due to speed action when energized from a standard type transmitter has been determined as follows $$E_{c_{12}} = -\frac{3}{2} \frac{X_{mc}}{\sqrt{2}} \left[ \frac{Em_1}{Z_1} \epsilon^{-j\alpha_1} - \frac{Em_2}{Z_2} \epsilon^{-j\alpha_2} \right]$$

Therefore the conditions for reducing the speed error to substantially zero are $$\frac{Em_1}{Z_1} = \frac{Em_2}{Z_2} \text{ and } \alpha_1 = \alpha_2$$

where:

$E_{c_{12}}$ is the secondary voltage of the control transformer, $X_{mc}$ is the equivalent mutual reactance between primary phases and secondary of the control transformer; divide by $n$ for $n$ equal control transformers in parallel.

$Em_1$ is the amplitude of the three phase positive sequence system of generator secondary voltages, $Em_2$ is the amplitude of the three phase negative sequence system of generator secondary voltages, $Z_1$ is the circuit impedance offered to the positive sequence system voltage $Em_1$, $Z_2$ is the circuit impedance offered to the negative sequence system voltage $Em_2$, and $\alpha_1$ and $\alpha_2$ are the phase angle of the currents relative to the transmitter secondary E. M. F.'s $Em_1$ and $Em_2$ respectively.

$\epsilon$ is the base number 2.718 ... of the Napierian logarithm system.

The phase angles are a function of the ratio $$\frac{X}{R}$$

of the components of $Z_1$ and $Z_2$.

Stated somewhat differently speed error voltage exists because the impedances $Z_1$ and $Z_2$ do not vary with frequency in the same proportion as the voltages $Em_1$ and $Em_2$ and in addition because such impedances do not maintain a constant ratio of imaginary to real component with changing frequency. A standard type transmitter gives positive and negative sequence voltages $Em_1$ and $Em_2$ that have magnitudes proportional to their respective frequencies $f_1$ and $f_2$. Thus, if $Z_1$ and $Z_2$ had only an inductive reactance component the impedances would satisfy the requirements for zero speed voltage given above.

To practice the invention it is first necessary to determine accurately the impedance of the synchro system which includes the synchro transmitter and the control transformer. These determinations are made from measurements which are carried out in a conventional manner.

The determination of the resistance of each of the windings of the generator secondary and the control transformer primary is accomplished in each case by tying two of the legs to one side of a Wheatstone bridge and connecting the third leg to the other side. From this measurement, 1½ times the numerical value of the resistance of each leg is derived which is readily reducible to the magnitude of the resistance. Having determined the resistance, conventional A. C. means may be used to determine the inductance of each leg, the calculation in the latter case taking into account the value of resistance determined from the earlier measurement.

Knowing the values of resistance and inductance in the system impedances it is necessary to modify the impedances so that the error due to operation under speed conditions is reduced to zero. The corrector for producing the aforesaid conditions comprises as previously indicated three matched impedance branches 28, 29 and 30. Each branch includes a resistance in parallel with an inductance and a capacitance. The three resistances as well as the inductances and capacitances are accurately matched to keep the system balanced. Through mathematical manipulation, the equivalent real and reactive components of the impedance of each corrector branch is derived in equation form. By assuming a value for L such that the attenuation of signal between transmitter and control transformer is not too great, the values R and C for satisfying the conditions previously set forth may be calculated through trial and error. In operation the corrector impedance varies with frequency in such a way that the phase angle between current and applied voltage reduces with increasing frequency. The opposite effect occurs in the primary impedance of the control transformer, where the phase angle increases with increasing frequency. Thus the series impedance of the corrector and control transformer primary can be made to keep $\alpha_1 = \alpha_2$ where $\alpha_1$ and $\alpha_2$ are the phase angles of the resultant positive and negative sequence currents respectively. The magnitude of $\alpha_1$ and $\alpha_2$ is not required to remain constant throughout the speed range of operation. It is only necessary that $\alpha_1 = \alpha_2$ at all speeds. The magnitude of the corrector impedance is made to change at a greater rate than the frequency change to compensate for the lower rate of change in the primary impedance of the control transformer. This property is provided by the capacitances in the corrector. By this means the other requirement is accomplished, namely, that the ratio of circuit impedances is kept substantially equal to the ratio of applied voltages $$\frac{Em_1}{Em_2}$$

Since a synchro motor is of similar design to the standard type transmitter except for the damping means the secondary E. M. F.'s of a synchro motor are the same as those of the standard type transmitter. Therefore, in systems employing synchro motors and differential motors, instead of control transformers, no speed corrector is necessary since synchro motors develop under speed conditions, the same characteristic secondary voltages as those of the standard transmitters and with no spurious shift in synchronous position between the motor and the transmitter.

When using the corrector of this invention it is to be noted that no delta capacitor for power factor correction is used between the control transformer primary and the transmitter secondary. If such a delta capacitor were used it would introduce error. It offers different reactances to the different frequencies of the positive and negative sequence systems. As a result it would affect the relative magnitudes of the positive and negative sequence voltages applied by the transmitter which would cause the aforesaid error.

The corrector performance is not affected by acceleration of the synchro control system. The synchro control transformer will give an output voltage at power supply frequency when the control transformer and transmitter are turning at equal speeds. But it should be kept in mind that differential speed between these two units will result in a control transformer output of two different frequency components, one at higher and the other at lower than the power supply frequency. For example, if the 60-cycle synchro transmitter is turning at 1200 R. P. M. before the servo is started, the control transformer output voltage will have an 80-cycle component and a 40-cycle component. This dual-frequency signal applied to the reversing phase of the two-phase 60-cycle servo motor will subject the motor to a pulsating and reversing torque that may prevent it from starting. The maximum differential speed between transmitter and control transformer that will permit the servo motor to be self-starting will depend on the acceleration characteristic of the servo motor under load. Special automatic starting devices may be required for high speed servo mechanisms to permit them to start when the controlling synchro transmitter is already turning at half speed. The automatic starting devices must also be direction selective when used in transmitting equipment that may be operated in either direction.

Obviously many modifications and variations of the present invention are possible in the light of the above teachings. It is therefore to be understood that within the scope of the appended claims the invention may be practiced otherwise than as specifically described.

I claim:

1. A speed-error corrector for a synchro system that has a synchro generator with three output terminals and a control transformer with three input terminals said corrector comprising; three impedances, said impedances being of equal value, each impedance including a resistance, an inductance and a capacitance connected in parallel; each impedance being adapted for connection in series with one of the output terminals of the synchro generator and one of the input terminals of the control transformer.

2. A synchro system comprising a synchro generator having three electrically connected windings and three output terminals connected to the three windings, respectively; a control transformer having three electrically connected input windings and three input terminals connected to the control transformer input windings, respectively; a corrector for correcting speed error by neutralizing speed error voltage, said corrector connected in series between said synchro generator and said control transformer, said corrector comprising three impedances, said impedances being of equal value, each impedance including a resistance, an inductance, and a capacitance connected in parallel, each impedance connected in series between one output terminal of said synchro generator and one input terminal of said control transformer.

3. A synchro system comprising a synchro generator having three electrically connected windings and three output terminals connected to the three windings, respectively; a control transformer having three electrically connected input windings and three input terminals connected to the three control transformer input windings, respectively; a corrector for correcting speed error over a range of synchro generator speeds by continuously neutralizing speed error voltage, said corrector connected in series between said synchro generator and said control transformer, said corrector including three impedances, the corresponding parameters of said three impedances being of equal value, each of the three impedances connected in series between one output terminal of said synchro generator and one input terminal of said control transformer.

4. A synchro system as described in claim 3 wherein the three impedances of said corrector are stationary impedances.

5. A synchro system comprising a synchro generator; a differential generator connected in circuit with said synchro generator; said differential generator having three electrically connected output windings and three output terminals connected to the three output windings, respectively; a control transformer having three electrically connected input windings and three input terminals connected to the control transformer input windings, respectively; a corrector for correcting speed error by neutralizing speed error voltage, said corrector connected in series between said differential generator and said control transformer, said corrector including three impedances, the corresponding parameters of said impedances being of equal value, each of the three impedances connected in series between one output terminal of said differential generator and one input terminal of said control transformer.

6. A synchro system as described in claim 5 where said corrector impedances each include a resistance, an inductance, and a capacitance connected in parallel.

7. A synchro system as described in claim 5 wherein the three impedances of said corrector are stationary impedances.

References Cited in the file of this patent

UNITED STATES PATENTS

| | | |
|---|---|---|
| 2,544,710 | McCarthy et al. | Mar. 13, 1951 |
| 2,581,428 | McCarthy | Jan. 8, 1952 |
| 2,632,138 | Philpott | Mar. 17, 1953 |
| 2,651,010 | Wendt | Sept. 1, 1953 |
| 2,700,745 | Depp et al. | Jan. 25, 1955 |